(12) United States Patent
Weinzierle et al.

(10) Patent No.: US 11,112,293 B2
(45) Date of Patent: Sep. 7, 2021

(54) IMPEDANCE LEVEL SENSOR

(71) Applicant: VEGA GRIESHABER KG, Wolfach (DE)

(72) Inventors: Christian Weinzierle, Wolfach (DE); Juergen Haas, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 149 days.

(21) Appl. No.: 16/410,759

(22) Filed: May 13, 2019

(65) Prior Publication Data
US 2019/0353513 A1  Nov. 21, 2019

(30) Foreign Application Priority Data
May 17, 2018 (DE) .................... 10 2018 111 960.7

(51) Int. Cl.
*G01F 23/26* (2006.01)
(52) U.S. Cl.
CPC .................... *G01F 23/266* (2013.01)
(58) Field of Classification Search
CPC ..... G01F 23/265; G01F 23/266; G01F 23/268
See application file for complete search history.

(56) References Cited

U.S. PATENT DOCUMENTS 2,573,172 A * 10/1951 Ennis ....................... G05D 9/12
                                                  137/172
4,589,281 A    5/1986 Aldrich
5,973,415 A * 10/1999 Brenner ................ G01F 23/268
                                                  307/118
6,361,396 B1   3/2002 Snyder et al.
2006/0285212 A1* 12/2006 Gundlach ............. G01F 23/266
                                                  359/604
2011/0259953 A1* 10/2011 Baarman ................ G01F 23/20
                                                  235/375
2014/0159743 A1*  6/2014 Dayal ..................... G01R 27/02
                                                  324/649
2018/0093042 A1*  4/2018 Klemm .................... A61M 5/24

OTHER PUBLICATIONS

GPTO Office Action for related German application 10 2018 111 960.7, dated Apr. 4, 2019.

* cited by examiner

*Primary Examiner* — Francis C Gray
(74) *Attorney, Agent, or Firm* — William Gray Mitchell

(57) ABSTRACT

Impedance level sensor with
a probe, which is influenced by a medium surrounding the probe in a measuring capacity, with the probe comprising a measuring electrode and a reference electrode isolated from the measuring electrode, between which the measuring capacity forms,
a measuring oscillation circuit, in which the probe is arranged as a capacity-determining element,
an electronic unit with a signal generator to excite the measuring oscillation circuit,
an evaluation and control unit for generating a measuring signal, which is connected to the electronic unit,
characterized in that the electronic unit comprises a current meter for detecting a current at the input of the signal generator.

6 Claims, 5 Drawing Sheets

IMPEDANCE LEVEL SENSOR

CROSS REFERENCE TO RELATED APPLICATIONS

This patent application claims priority to German Patent Application 10 2018 111 960.7, filed on May 17, 2018.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The present invention relates to an impedance point level sensor.

Background of the Invention

The present invention Impedance point level sensors are generally known in prior art, for example for measuring limits or fill levels. Typical applications for detecting a predefined fill level (limit) include, for example, process containers, such as process tanks, storage tanks, silos, or pipelines in the processing industry. Impedance point level sensors are here often used as a so-called limit switches, i.e. to determine whether a filling medium exceeds or falls short of a specific fill level, the so-called limit, in different liquids, as well as granulated and powdered bulk materials.

Other types of limit switches or limit gauges are known as well, which are selected depending on the application field, process conditions, and properties of the filling medium. In addition to impedance point level sensors, here sensors are used that work according to the TDR (Time Domain Reflectometry) principle, or vibration limit sensors or capacitive sensors. For example, a switch command of the limit switch can start or stop filling equipment or draining equipment in order to avoid the respective process container running over or running empty.

In the present application, instead of the term impedance point level sensors, for reasons of simplicity the terms impedance sensor, limit switch, or limit gauge are also used as synonyms.

A known impedance sensor 100 is shown in FIG. 1.

FIG. 1 shows a simplified diagram of switch blocks of an impedance sensor 100 according to the prior art. Essentially, the impedance sensor 100 known from prior art comprises an electronics unit 101 and a probe 102. The probe 102 is designed in the present exemplary embodiment as a serial oscillation circuit. A measuring capacity 110 forms between a measuring electrode 106 and a reference electrode 108, which is connected to a discrete inductance 109 to the measuring oscillation circuit formed as a serial oscillation circuit.

The measuring electrode 106 is designed rotary-symmetrically to a longitudinal axis L of the impedance sensor 100 and separated from a process room 90 via isolation 107. The reference electrode 108 is embodied in the present impedance sensor 100 also in a manner rotary symmetric to the longitudinal axis L. The reference electrode 108 is formed in the present exemplary embodiment as a tube, which simultaneously forms a part of the sensor housing. The measuring electrode 106, seen in the direction of the longitudinal axis L, is arranged upstream the tube and surrounded by isolation 107 arranged at the tube. The isolation 107 forms simultaneously a front end of the housing.

Advantageously, discrete inductance 109 is selected such that a resonance frequency fres of the oscillation circuit is set for various media and/or covering conditions (empty, full, and contaminated) between 100 MHz and 200 MHz.

An amount of a complex value-sensitive impedance |Z| of this measuring oscillation circuit varying due to frequencies is advantageously analyzed between 100 MHz and 200 MHz, i.e., the measuring oscillation circuit is stimulated by a frequency generator 103 with a frequency sweep showing frequencies between 100 MHz and 200 MHz, and a response signal (frequency response) of the measuring oscillation circuit is detected with a frequency detector 104. If a medium is in the proximity of the probe 102, the impedance behavior of the measuring oscillation circuit changes, i.e., in particular, its resonance frequency fres shifts, at which a minimum of the impedance forms.

A frequency sweep is understood as the sequential excitation with a plurality of consecutive frequencies within a frequency range, whereby the frequency range ideally contains all possible resonance frequencies of the measuring oscillation circuit.

The change in the impedance of the measuring oscillation circuit is used for an analysis in an evaluation and control unit 105. Specifically, the frequency response with regard to a frequency change Af and a change in the amplitude of a minimum of the impedance Z, also called an amplitude change, are evaluated and a switching command is generated therefrom. Alternatively, the evaluation may also occur at a maximum of the impedance Z.

The impedance sensors according to the prior art are used at process temperatures from −40° C. to +115° C. These temperature differences have a strong influence upon the behavior of the frequency generator 103 and the frequency detector 104, so that it can lead to measurement errors and thus to false switching commands. This is perceived as a disadvantage of the prior art.

As an example, FIG. 2 lists the frequency responses of the impedance sensor 100 according to the state of the art for the medium ketchup.

The first curve 200 shows the resonance behavior of a clean probe 102. The amount of impedance Z is shown in reference to the frequency f.

The behavior of a probe 102 contaminated with the adhesion of ketchup is shown in curve 201 and the probe 102 completely covered with ketchup is shown in curve 202.

Switching commands (empty, full) are realized by the evaluation and control unit 105, whereby according to the prior art only minimums of the resonance curves are used for the analysis. They are evaluated in reference to a frequency change Af and amplitude change AZ. If the minimum of the resonance curve is located in a first range I, the evaluation and control unit 105 issues the switch command "empty". If, however, the minimum is in a second range II, here the "full" status is issued. The two defined switching ranges I, II can be programmed in the impedance sensor 100 by the factory or adjusted and changed by a customer alignment. Ideally, the areas should be defined in such a way that, for as many different media as possible, the standard settings are sufficient, since a customer-side alignment is time-consuming and is therefore undesired.

The impedance sensors 100 are used at processing temperatures from −40° C. to +115° C. This leads to the electronics unit 101 of the impedance sensor 100 being exposed to relatively high temperature fluctuations.

FIG. 3 shows two resonance curves of the impedance sensor 100 in an uncovered state of the probe 102, with the curve 300 describing the behavior at +25° C. and the curve 300 x describing the behavior at +115° C. As can be seen from FIG. 3, the minimum of curve 300 is at +25° C. in range I and the minimum of curve 300' at +115° C. in range II, which corresponds to different switching states of the impedance sensor 100. Due to the temperature relationship of the electronics unit 101 here temperature influences can lead to false switching decisions of the impedance sensor 100.

This problem shall be solved with the present invention as disclosed herein.

BRIEF SUMMARY OF THE INVENTION

In a preferred embodiment, an impedance point level sensor (100) with
- a probe (102), which can be influenced by a medium surrounding the probe (102) in a measuring capacity (110), with the probe (102) comprising a measuring electrode (106) and a reference electrode (108) isolated from the measuring electrode (106), with the measuring capacity (110) forming therebetween,
- a measuring circuit, in which the probe (102) is arranged as a capacity-determining element,
- an electronics unit (101) with a signal generator (103) for analyzing the measuring oscillation circuit,
- an evaluation and control unit (105) for generating a measuring signal, connected to the electronics unit (101), characterized in that the electronics unit (101) comprises a current meter (402) for detecting a current at an input of the signal generator (103).

In another preferred embodiment, the impedance sensor (100) as described herein, characterized in that the current meter (402) is embodied as a current sensor (402).

In another preferred embodiment, the impedance sensor (100) as described herein, characterized in that the current sensor (402) is embodied as a current resistor.

In another preferred embodiment, the impedance sensor (100) as described herein, characterized in that the current meter (402) is embodied as a magnetic field sensor.

In an alternative preferred embodiment, a method for operating an impedance sensor (100) with
- a probe (102), which can be influenced by a medium surrounding the probe (102) in a measuring capacity (110), with the probe (102) comprising a measuring electrode (106) and a reference electrode (108) isolated from the measuring electrode (106), between which the measuring capacity (110) forms,
- a measuring oscillation circuit, in which the probe (102) is arranged as a capacity-determining element,
- an electronics unit (101) with a signal generator (103) to excite the measuring oscillation circuit,
- an evaluation and control unit (105) for generating a measuring signal, which is connected to the electronics unit (101), in which the measuring oscillation circuit is excited via the signal generator (103) with a plurality of different frequencies, characterized in that the resonance point of the measuring oscillation circuit occurs by determining a current (I) at an input of the signal generator (103).

In another preferred embodiment, the method for operating an impedance sensor (100) as described herein, characterized in that the current (I) occurs by a voltage measurement at a current resistor.

DETAILED DESCRIPTION OF THE INVENTION

Figure 1:
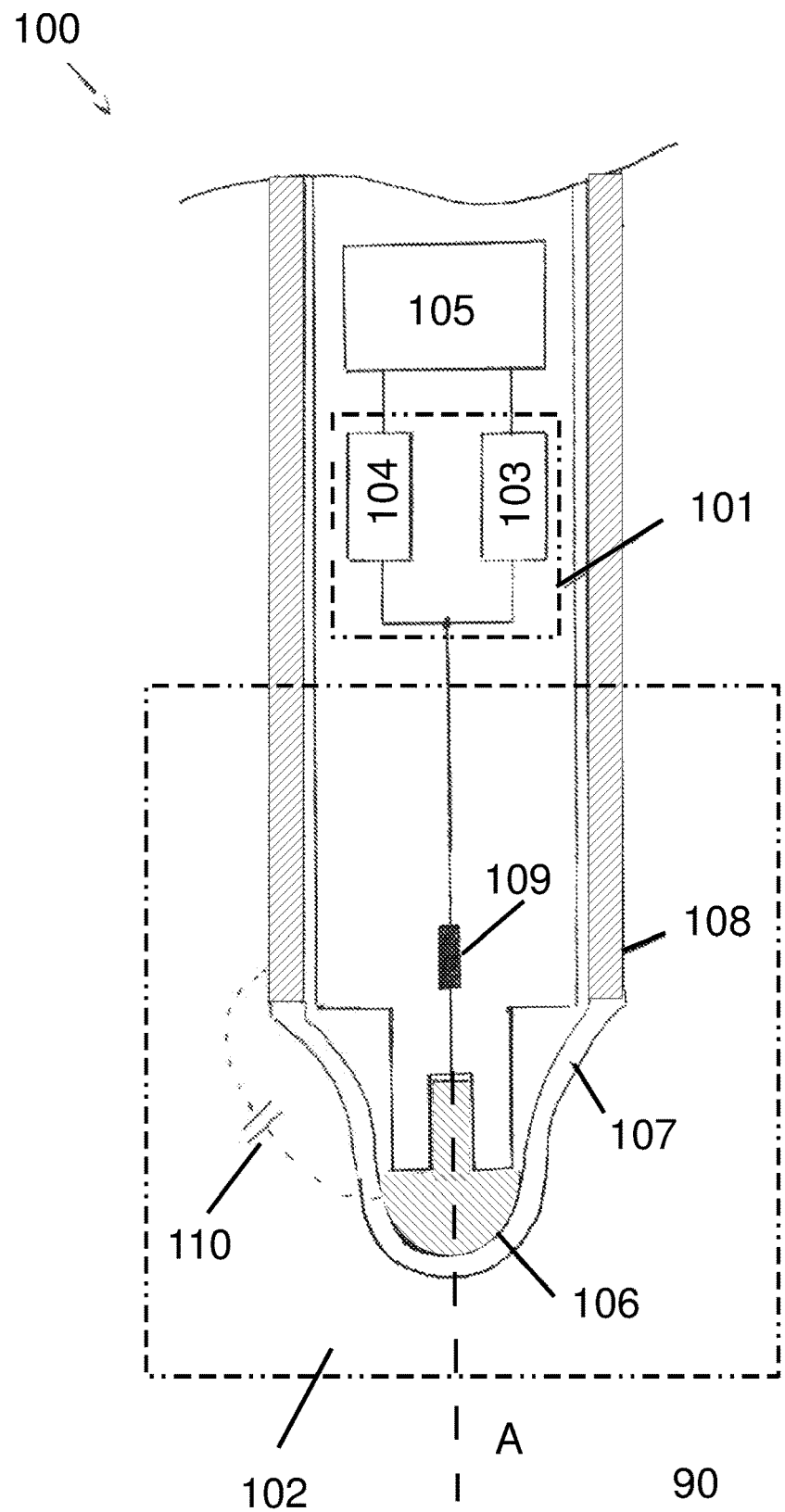
FIG. 1 is a line drawing evidencing a block diagram of an impedance sensor according to prior art (already discussed).
Figure 2:
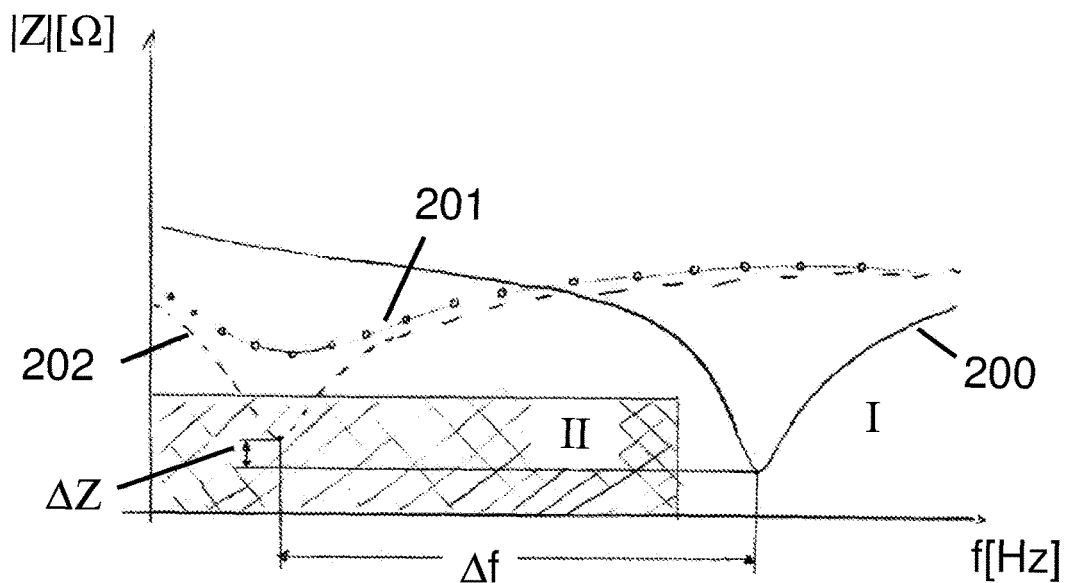
FIG. 2 is a graph measuring curves of the frequency response of an impedance sensor (already discussed) which is uncovered, soiled, or covered with a medium.

The impedance sensor according to the invention comprising a probe, which can be influenced by a medium surrounding the probe in a measuring capacity, with the probe comprising a measuring electrode and a reference electrode isolated from the measuring electrode, between which the measuring capacity forms, a measuring oscillation circuit, in which the probe is arranged as a capacity determining element, an electronics unit with a signal generator to excite the measuring circuit, and an evaluation and control unit for generating a measuring signal, which is connected to the electronics unit, is characterized in that the electronics unit comprises a current meter for detecting a current at an input terminal of the signal generator.

The current at the input terminal of the signal generator, hereinafter also called input current, or a signal corresponding to the input current is fed to the evaluation or control unit as the input signal, which based on the input signal determines the resonance frequency.

The present invention is based on the acknowledgment that the current input of the signal generator increases considerably when the measuring oscillation circuit is excited on its resonance frequency. This effect is utilized to determine the resonance frequency via the measurement of the accepted current. For this purpose, it is assumed that the excitation frequency generated by the signal generator at the time of increased current intake is equivalent to the resonance frequency.

The evaluation and control unit may show e.g., an A/D-converter, which digitizes the current progression measured and, together with the information regarding the control of the signal generator formed for instance as a voltage-controlled oscillator (VGO), determines the resonance frequency and based thereon issues a switching signal.

By determining the resonance frequency based on a current measurement at the signal generator, it is no longer necessary to install a separate signal detector. Due to the fact that the signal detector in prior art represents the component that shows the strongest reaction to temperature in the measuring arrangement used, by omitting the signal detector and determining the resonance frequency based on the current intake of the signal generator the temperature sensitivity of the measuring arrangement can be drastically reduced. Further, the current measurement can be realized with fewer and very low-cost components, so that the costs of the impedance point level sensor and the complexity of the measuring arrangement can be considerably reduced.

The current measuring device can be formed e.g. as a current sensor, particularly as a current resistor or a magnetic field sensor. When using a current sensor, the current measurement can occur in a simple fashion. Such a current measurement can be realized in a particularly simple and cost-effective fashion when a current resistor is used. When using a resistor, e.g., in the supply line of the signal generator, the current flowing through the resistor can be determined by measuring the dimension of resistance via a voltage measurement.

If no option is available to use the resistance in the supply line of the signal generator, a magnetic field generated by the current flowing through the supply line can be determined by a magnetic field sensor and therefrom, the current flowing can be deduced.

A method according to the invention for operating an impedance point level sensor with a probe, which can be influenced in its measuring capacity by a medium surrounding the probe, with the probe comprising a measuring electrode and a reference electrode isolated from the measuring electrode, between which a measuring capacity forms, comprising a measuring oscillation circuit, in which the probe is arranged as a capacity-determining element, an electronics unit with a signal generator for exciting the measuring excitation circuit, and an evaluation and control unit for generating a measuring signal, which is connected to the electronics unit, with the measuring oscillation circuit being excited via the signal generator successively with a plurality of different frequencies is characterized in that a resonance point, particularly a resonance frequency of the measuring oscillation circuit occur by determining a current at a terminal at the signal generator.

The present method is based on the acknowledgement that the current intake of the signal generator is considerably increased when the measuring oscillation circuit is excited with its resonance frequency. This effect is used here to determine the resonance frequency and/or resonance point via the measurement of the current intake. For this purpose, it is assumed that the excitation frequency generated by the signal generator at the time of the elevated current intake is equivalent to the resonance frequency. The evaluation and control unit may for this purpose show e.g., an A/D-converter, which digitizes the measured current progression and, together with the information regarding the control of the signal generator, e.g., be embodied as a voltage-controlled oscillator, the resonance frequency can be determined and based thereon a switching signal can be issued.

A determination of the input current can occur e.g., by the voltage measurement at a current resistor.

DETAILED DESCRIPTION OF THE FIGURES

In the figures, unless stipulated otherwise, identical reference characters mark identical components with the same function.

The division into individual functional blocks is used hereinafter only for better illustration and explanation and may deviate in the individual case from the arrangement used.

Figure 4:
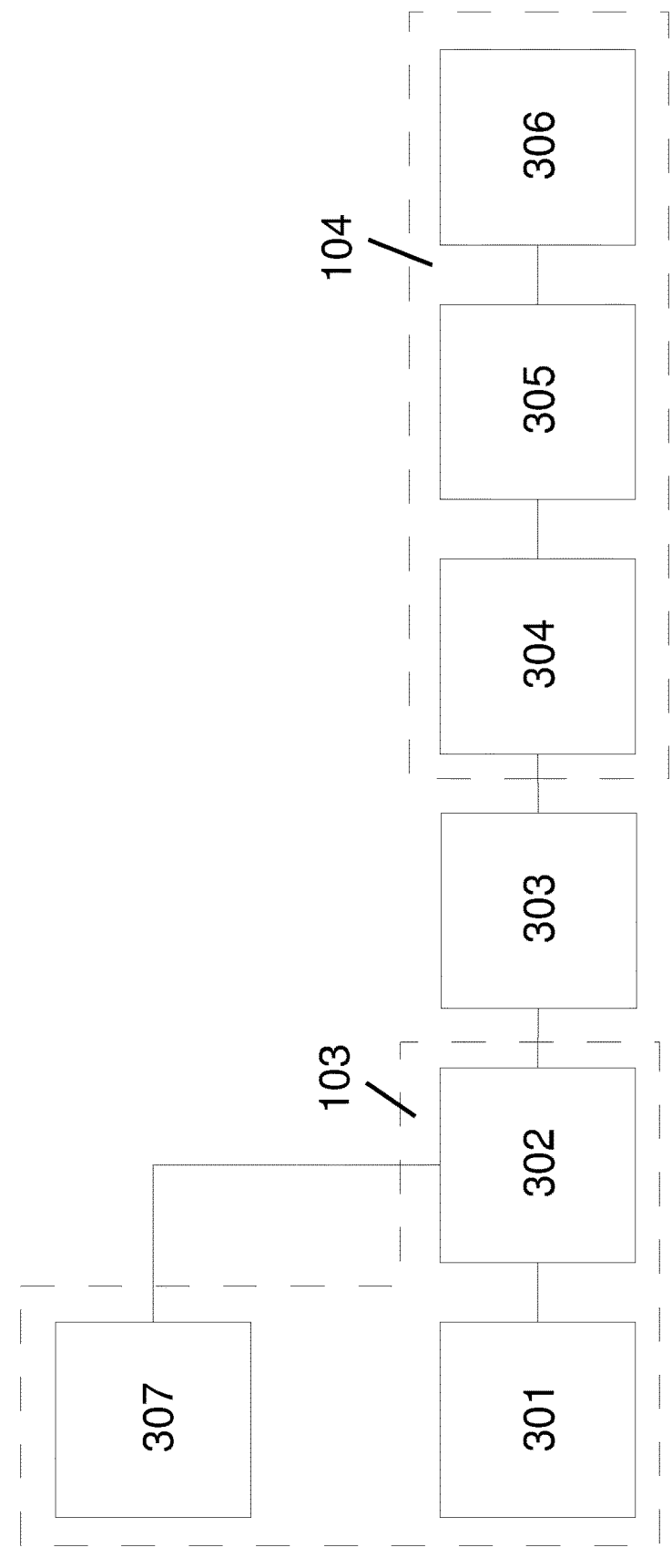
FIG. 4 is a block diagram of an impedance sensor according to the prior art.

For illustrative purposes, FIG. 4 shows a block diagram of an impedance point level sensor 100, hereinafter for reasons of simplification also called impedance sensor 100. The impedance sensor 100 shows a signal generator 103 and a signal detector 104, connected via a sensor block, 303, representing the probe 102, which in the present case forms the serial oscillation circuit with a measuring capacity 110 embodied between a measuring electrode 106 and a reference electrode 108, and an inductivity 109.

The signal generator 103 comprises in the block diagram of FIG. 4 a D/A converter 301 as well as a voltage-controlled oscillator 302. The voltage-controlled oscillator 302 is fed from an energy supply unit 307 and at the input side fed by the D/A-converter 301 with the voltage ramp. At the output side the voltage-controlled oscillator 302 provides a frequency ramp, a so-called frequency sweep. This frequency sweep is supplied to the sensor block 303.

The sensor block 303 comprises essentially a serial oscillation circuit from a discrete inductivity 109 and a measuring capacity 110. The measuring capacity 110 is formed from the measuring electrode 106, an isolation 107, as well as the reference electrode 108 (cf. FIG. 1), with the measuring capacity 110 forming between the measuring electrode 106 and the reference electrode 108. The value of the measuring capacity 110 can be modified by the fill medium to be monitored, which acts as a dielectric, so that a resonance frequency fres of the serial oscillation circuit changes based on a coverage status of the sensor.

The resonance behavior of the sensor block 303 is processed and analyzed with the signal detector 104. The signal detector 104 includes in a block diagram of FIG. 4 according to prior art an AM-demodulator 304 and a downstream switched amplifier circuit 305. The demodulated resonance curve is finally digitized with an A/D-converter 306 and fed to the evaluation and control unit 105 (cf. FIG. 1).

Figure 3:
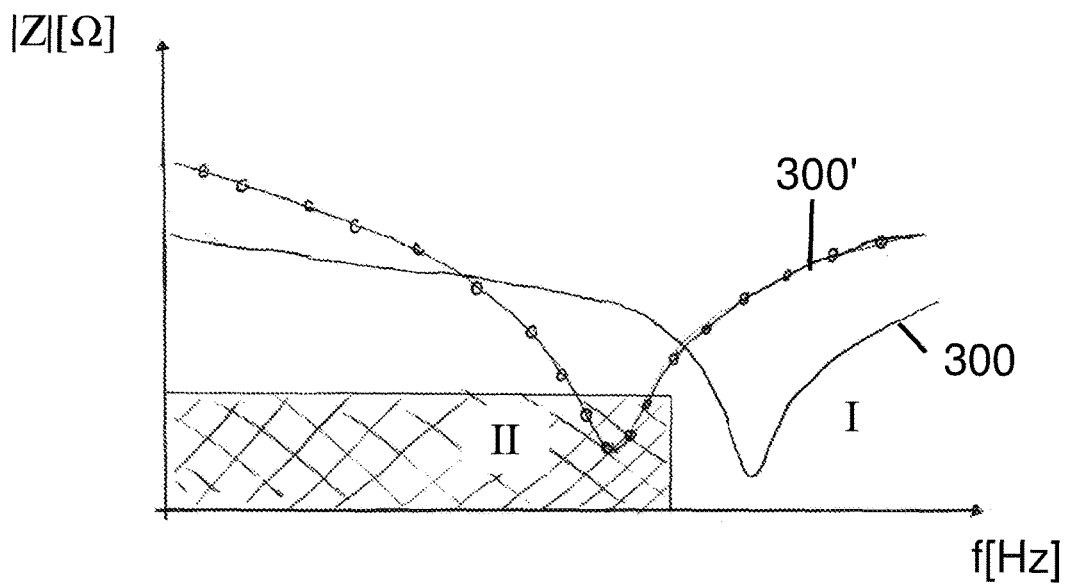
FIG. 3 is a graph measuring curves of an uncovered impedance sensor according to prior art at different temperatures (already discussed).

The signal detector 104, and here particularly the AM-demodulator 304, comprises a strong temperature dependency, which leads to a distinct temperature curve of the measuring results and thus may lead to the faulty detections shown in FIG. 3.

Figure 5:
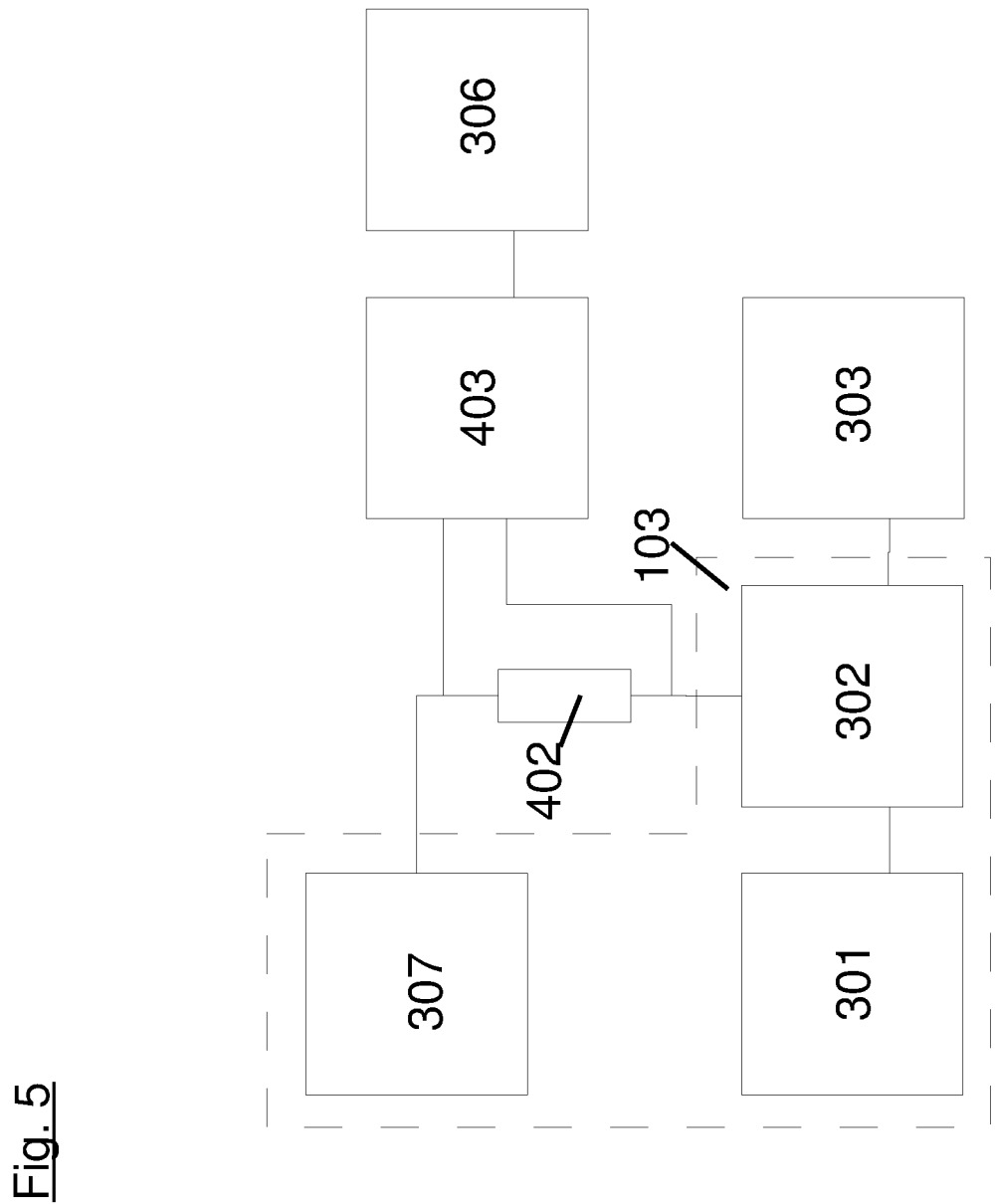
FIG. 5 is a block diagram of an impedance sensor according to the present application.

FIG. 5 shows a block diagram of an impedance sensor 100 according to the present application.

Unlike the block diagram of FIG. 4, in FIG. 5 only the signal generator 103 is connected to the sensor block 303. There is no signal detector 104, as common in prior art.

In order to allow the determination of the resonance frequency fres and/or resonance point of the sensor block 303, current sensor 402 is arranged between the energy supply 307 and the voltage-controlled oscillator 302, in the present case embodied as a current resistor. Depending on the resonance behavior of the sensor block 303 the voltage-controlled oscillator 302 draws a different current I. At the current resistor 402 a voltage U develops, corresponding to the current I, which is measured via the measuring circuit 403. The measuring circuit 403 is, for this purpose, connected to the input side and the output side of the current resistor 402.

The measuring circuit 403 can be realized, for example, with a discretely designed difference amplifier or a commercially obtained current meter.

As an alternative to determining the current via the current resistor 402 and a voltage measurement, here any other option of current measurement may be used.

The measurements of the measuring circuit 403 allows clearly to detect the resonance behavior of the sensor block 303 and to digitize them with the A/D-converter 306.

Figure 6:
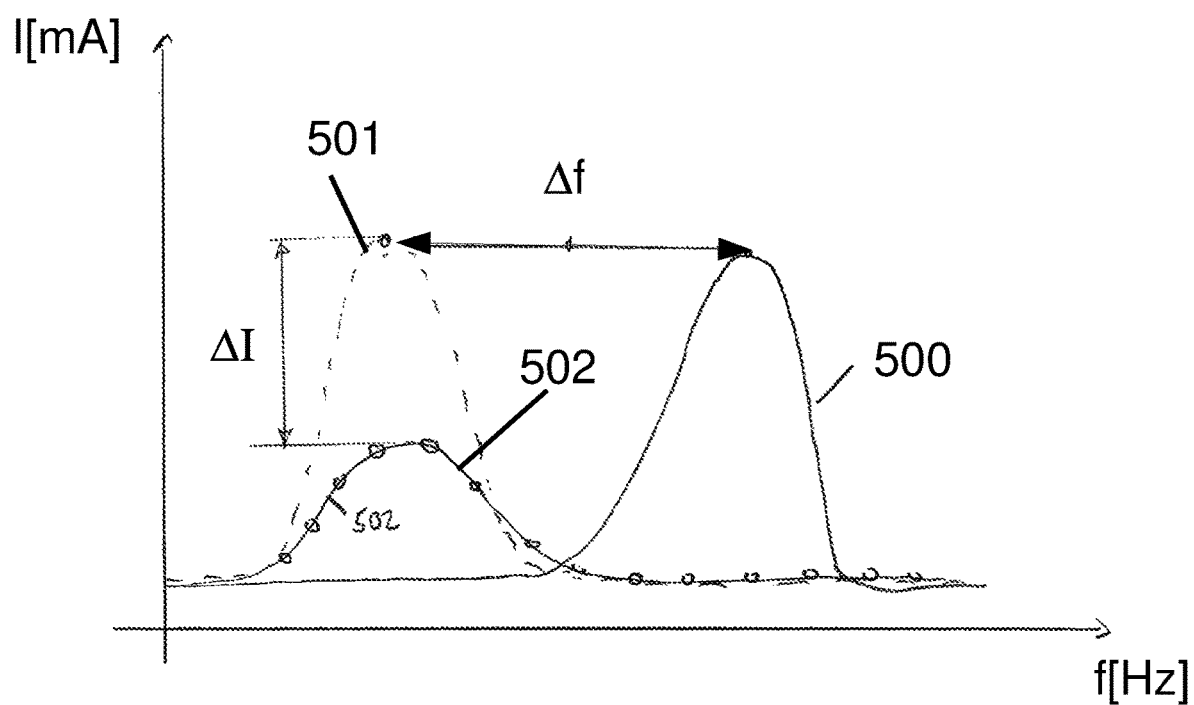
FIG. 6 is a graph measuring the current progression at the input of the signal generator at an impedance sensor according to FIG. 5.

FIG. 6 shows the current curve, as measured by the current sensor 402, at the input of the voltage-controlled oscillator 302 at an impedance sensor 100 with a design according to FIG. 5. The diagram shows the progression of the current I[mA] via the frequency f[Hz] for three different coverage conditions of the probe 102 using ketchup as the fill medium.

The curve 500 shows the resonance behavior of a clean probe 102. When the probe 102 is covered completely with ketchup, the resonance behavior of the second curve 501 results. The behavior of a probe 102 soiled with ketchup is characterized by the third curve 502. The switching commands (empty, full) are realized by the evaluation and control unit 105, with exclusively the maximums of the current progression being relevant for the evaluation. In the current measurement the frequency change Af and the change of the measured current AI is measured, thus the change in amplitude.

It is discernible from FIG. 6 that the resonance behavior of the sensor block 303 and thus the coverage status of the impedance sensor 100 from the current progression at the input of the signal generator and/or at the voltage-controlled oscillator 302 can be just as well determined as with the measuring method of prior art. In reference to prior art, the present design shows the advantage that it comprises a considerably lower temperature sensitivity and can be produced in a much more cost-effective fashion.

LIST OF REFERENCE NUMERALS

90 Process room
100 Impedance point level sensor, impedance sensor
101 Electronics unit
102 Probe
103 Signal generator
104 Signal detector
105 Evaluation and control unit
106 Measuring electrode
107 Insulation
108 Reference electrode housing
109 Inductance
110 Measuring capacity
200 Curve, first
201 Curve, second
202 Curve, third
300 Curve
300' Curve
301 D/A converter
302 Voltage-controlled oscillator
303 Sensor block
304 Demodulator
305 Amplifier circuit
306 A/D converter
307 Energy supply unit
402 Current meter, current sensor
403 Measuring circuit
500 Curve, first
501 Curve, second
502 Curve, third
I First area
II Second area
A
f Frequency
Δf Frequency change
fres Resonance frequency
I Amperage
U Voltage
Z Impedance

We claim:

1. An impedance point level sensor, comprising:
a probe, which can be influenced by a medium surrounding the probe in a measuring capacity, with the probe comprising a measuring electrode and a reference electrode isolated from the measuring electrode, with the measuring capacity forming therebetween,
a measuring oscillation circuit, in which the probe is arranged as a capacity-determining element,
an electronics unit with a signal generator for analyzing the measuring oscillation circuit and exciting the measuring resonant circuit with a frequency sweep, and
an evaluation and control unit for generating a measuring signal, connected to the electronics unit,
wherein the electronics unit comprises a current meter for detecting a current at an input of the signal generator.

2. The impedance point level sensor according to claim 1, wherein the current meter is embodied as a current sensor.

3. The impedance point level sensor according to claim 2, wherein the current sensor is embodied as a current resistor.

4. The impedance point level sensor according to claim 1, wherein the current meter is embodied as a magnetic field sensor.

5. A method for operating an impedance point level sensor with
a probe, which can be influenced by a medium surrounding the probe in a measuring capacity, with the probe comprising a measuring electrode and a reference electrode isolated from the measuring electrode, between which the measuring capacity forms,
a measuring oscillation circuit, in which the probe is arranged as a capacity-determining element,
an electronics unit with a signal generator to excite the measuring oscillation circuit and, excite the measuring resonant circuit with a frequency sweep, and
an evaluation and control unit for generating a measuring signal, which is connected to the electronics unit, in which the measuring oscillation circuit is excited via the signal generator with a plurality of different frequencies,
wherein the resonance point of the measuring oscillation circuit occurs by determining a current at an input of the signal generator.

6. The method for operating an impedance point level sensor according to claim 5, wherein the current occurs by a voltage measurement at a current resistor.

* * * * *